United States Patent
Cho et al.

(10) Patent No.: US 10,491,105 B1
(45) Date of Patent: Nov. 26, 2019

(54) POWER CONVERTER AND DEAD-TIME CONTROL CIRCUIT THEREFOR

(71) Applicant: ELECTRONICS AND TELECOMMUNICATIONS RESEARCH INSTITUTE, Daejeon (KR)

(72) Inventors: Young Kyun Cho, Daejeon (KR); Myung Don Kim, Daejeon (KR); Seok Bong Hyun, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 16/047,290

(22) Filed: Jul. 27, 2018

(30) Foreign Application Priority Data

May 10, 2018 (KR) .................. 10-2018-0053949

(51) Int. Cl.
*H02M 3/158* (2006.01)
*H02M 1/38* (2007.01)

(52) U.S. Cl.
CPC .............. *H02M 1/38* (2013.01); *H02M 3/158* (2013.01); *H02M 2001/385* (2013.01)

(58) Field of Classification Search
CPC .... H02M 3/156; H02M 3/158; H02M 3/1588; H02M 3/155; H02M 3/1582; H02M 3/157; H02M 3/1563; H02M 2001/0012; H02M 2001/0009; H02M 2001/385; H02M 2003/1566; H02M 2003/1557
See application file for complete search history.

(56) References Cited

U.S. PATENT DOCUMENTS

| | | |
|---|---|---|
| 6,686,773 B1 | 2/2004 | Dash et al. |
| 6,958,592 B2 | 10/2005 | Chapuis |
| 7,456,620 B2 | 11/2008 | Maksimovic et al. |
| 8,179,106 B2 | 5/2012 | Tokura et al. |
| 8,933,679 B2 | 1/2015 | Zhak et al. |

(Continued)

OTHER PUBLICATIONS

Wai Lau et al., "An integrated controller for a high frequency buck converter", Power Electronics Specialists Conference, 1997. PESC '97 Record., 28th Annual IEEE.

(Continued)

*Primary Examiner* — Nguyen Tran
*Assistant Examiner* — Bryan R Perez
(74) *Attorney, Agent, or Firm* — LRK Patent Law Firm

(57) ABSTRACT

A power converter and a dead-time controller for a power converter. The power converter includes a first power switching element through which an input voltage is applied, a second power switching element connected to the first power switching element through a switching node, an output circuit coupled to the switching node, a control switching element configured to control the first power switching element and the second power switching element through a first control node connected to the first power switching element and a second control node connected to the second power switching element, and a control assist unit configured to control the control switching element on the basis of voltages of the switching node and the first control node or voltages of the switching node and the second control node.

14 Claims, 11 Drawing Sheets

(56) References Cited

U.S. PATENT DOCUMENTS

| | | | |
|---|---|---|---|
| 9,083,255 B2 | 7/2015 | Duan et al. | |
| 9,166,469 B2 | 10/2015 | Familiant et al. | |
| 9,172,305 B2 | 10/2015 | Zhak et al. | |
| 9,712,046 B2 | 7/2017 | Sandner et al. | |
| 9,793,811 B2 | 10/2017 | Noh et al. | |
| 2015/0357915 A1* | 12/2015 | Kim | H02M 1/38 323/271 |
| 2016/0118977 A1* | 4/2016 | Yi | H02M 3/1588 323/271 |
| 2016/0164413 A1* | 6/2016 | Akiyama | H03K 17/04206 323/271 |

OTHER PUBLICATIONS

Changsik Yoo, "A CMOS buffer without short-circuit power consumption", IEEE Transactions on Circuits and Systems II: Analog and Digital Signal Processing, vol. 47, No. 9, Sep. 2000.

Vahid Yousefzadeh "Sensorless optimization of dead times in DC-DC converters with synchronous rectifiers", IEEE Transactions on Power Electronics, vol. 21, No. 4, Jul. 2006.

Sungwoo Lee et al., "Accurate dead-time control for synchronous buck converter with fast error sensing circuits", IEEE Transactions on circuits and systems I: Regular Papers, vol. 60, No. 11, Nov. 2013.

Jing Xue et al., "Enabling high-frequency high efficiency non-isolated boost converters with quasi-square-wave zero-voltage switching and on-chip dynamic dead-time-controlled synchronous gate drive", IEEE Transactions on Power Electronics, vol. 30, No. 12, Dec. 2015.

Seyed Milad Tayebi et al., "Dynamic dead-time optimization and phase skipping control techniques for three=phase microinverter applications", IEEE Transactions on Industrial Electronics, vol. 63, No. 12, Dec. 2016.

Chung-Hsun Huang et al., "A high-efficiency current-mode buck converter with a power-loss-aware switch-on-demand modulation technique for multifunction SoCs", IEEE Transactions on Power Electronics, vol. 31, No. 12, Dec. 2016.

Chundong Wu et al., "Asymmetrical dead-time control driver for buck regulator", IEEE Transactions on Very Large Scale Integration (VLSI) Systems, vol. 24, No. 12, Dec. 2016.

Zheyu Zhang et al. "Model based dead time optimization for Voltage-Source Converters Utilizing Silicon Carbide Semiconductors", IEEE Transactions on Power Electronics, vol. 32., No. 11, Nov. 2017.

Young-Kyun Cho et al., "Gate Switch Dead-Time Control for Buck-Boost Power Converter", The Journal of Korean Institute of Electromagnetic Engineering and Science, vol. 27, No. 1, Nov. 2017.

Young-Kyun Cho et al., "A low switching-noise and high efficiency buck converter using a continuous-time reconfigurable delta-sigma modulator", IEEE Transactions on Power Electronics, Feb. 2018.

Young-Kyun Cho et al., "Gate Switch Dead-Time Control Method for Buck-Boost Power Converter", Proceedings of the Korea Electromagnetic Engineering Society Conference, vol. 27, No. 1, Nov. 2017.

* cited by examiner

POWER CONVERTER AND DEAD-TIME CONTROL CIRCUIT THEREFOR

CROSS REFERENCE TO RELATED APPLICATION

This application claims priority to Korean Patent Application No. 10-2018-0053949, filed May 10, 2018 in the Korean Intellectual Property Office (KIPO), the entire content of which is hereby incorporated by reference.

BACKGROUND

1. Technical Field

Example embodiments of the present invention relate in general to a power converter and a dead-time control circuit for the power converter, and more specifically, to a power converter and a dead-time control circuit for controlling a dead-time of the power converter.

2. Description of Related Art

In recent years, battery-operated portable electronic products, such as cellular phones and notebook computers, have made tremendous strides. In order to increase an operating time of such portable electronic products, a battery lifetime should extend through an efficient power management circuit. One of the best strategies for more effective use of full battery capacity in a power management circuit is to utilize a switched-mode power supply.

Among switched-mode power supplies, a synchronous converter is being applied to a low-power system due to a high switching speed and a low conduction loss of a switching element. In such a synchronous converter, controlling switches to be turned on or off is very important to maintain reliability and high efficiency. In this regard, the synchronous converter has problems of suffering particularly from a significant energy loss at a high switching frequency and generating high current harmonics and voltage ripples.

In order to resolve the above-described problems, various control methods capable of reducing ON/OFF dead-times to be as much as possible have been proposed. Generally, a widely used adaptive dead-time control method is a method of controlling a dead-time by sensing a switching node voltage ($V_{Lx}$) of the synchronous converter, and a predictive dead-time control method is a method of controlling a dead-time using a switching period of a previous state. Both the above-described methods may attain high efficiency by suppressing operation of a body diode, but implementation is difficult and high costs are required because additional circuit components such as a comparator, a digital block, and the like are required. Further, the above-described methods should be designed to be very insensitive to a process-voltage-temperature (PVT) variation, and since the dead-time is controlled through sensing of a switching node signal mixed with noise, it is difficult to obtain high accuracy. A sensorless dead-time control method has been proposed to resolve the above-described problem, but this method has a difficulty in that an additional algorithm should be developed to obtain maximum efficiency.

As described above, the currently proposed dead-time control methods have various limitations such as difficulty in implementation, high costs, and low accuracy, and the like, and thus a more efficient dead-time control method is required.

SUMMARY

Accordingly, example embodiments of the present invention are provided to substantially obviate one or more problems due to limitations and disadvantages of the related art.

Accordingly, embodiments of the present disclosure provide a power converter.

Furthermore, embodiments of the present disclosure provide a dead-time controller for a power converter.

In order to achieve the objective of the present disclosure, a power converter may include a first power switching element through which an input voltage is applied, a second power switching element connected to the first power switching element through a switching node, an output circuit coupled to the switching node, a control switching element configured to control the first power switching element and the second power switching element through a first control node connected to the first power switching element and a second control node connected to the second power switching element, and a control assist unit configured to control the control switching element on the basis of voltages of the switching node and the first control node or voltages of the switching node and the second control node.

The control assist unit may reduce a dead-time between the first power switching element and the second power switching element, wherein the dead-time is generated by the control switching element The control assist unit may be connected to the first control node, the second control node, and the switching node and may be disposed parallel to the control switching element.

The control assist unit may control the second power switching element on the basis of a voltage of the switching node, which varies according to operation of the first power switching element driven by a driving signal.

The control assist unit may control the first power switching element according to an enable signal determined on the basis of the second power switching element to be turned off, and a voltage of the switching node.

The control assist unit may include a first assist transistor configured to assist an operation of turning on the second power switch; a first assist module connected to the switching node to drive the first assist transistor; a second assist transistor configured to assist an operation of turning on the first power switch; and a second assist module connected to the switching node to drive the second assist transistor.

The first assist module may be enabled in synchronized with a voltage of the switching node, which is changed to a low state, and the enabled first assist module turns the first assist transistor on, thereby turning the second power switching element on.

The second assist module may be enabled according to the voltage of the switching node in the low state and an enable signal, and the enabled second assist module turns the second assist transistor on, thereby turning the first power switching element on.

The power converter may further comprise a latch circuit coupled to the first control node and the second control node to supply the enable signal to the control assist unit.

Each of the first power switching element and the second power switching element may be a transistor element; and the first control node may be connected to a gate terminal of the first power switching element, and the second control node may be connected to a gate terminal of the second power switching element.

The control switching element may include a first control switching element connected to a first control node which is connected to a control terminal of the first power switching element; and a second control switching element connected to a second control node which is connected to a control terminal of the second power switching element.

The control switching element includes a first delay configured to delay a signal of the second control node and supply the delayed signal to the first control switching element; and a second delay device configured to delay a signal of the first control node and supply the delayed signal to the second control switching element.

The power converter may comprise a driving signal generator configured to generate a driving signal and supply the driving signal to the control switching element.

In other example embodiments, a dead-time controller configured to control a dead-time of a power converter including a first power switching element through which an input voltage is applied, a second power switching element coupled to the first power switching element through a switching node, and an output circuit coupled to the switching node, may comprise a control switching element configured to control the first power switching element and the second power switching element through a first control node connected to the first power switching element and a second control node connected to the second power switching element, and a control assist unit configured to reduce a dead-time, which is generated by the control switching element, between the first power switching element and the second power switching element on the basis of voltages of the switching node and the first control node or voltages of the switching node and the second control node.

The control assist unit may include a first assist transistor configured to assist an operation of turning on the second power switch; a first assist module connected to the switching node to drive the first assist transistor; a second assist transistor configured to assist an operation of turning on the first power switch; and a second assist module connected to the switching node to drive the second assist transistor.

The first assist module may be enabled in synchronized with a voltage of the switching node, which is changed to a low state, and the enabled first assist module turns the first assist transistor on, thereby turning the second power switching element on.

The second assist module may be enabled according to the voltage of the switching node in the low state and an enable signal, and the enabled second assist module may turn the second assist transistor on, thereby turning the first power switching element on.

The power converter may further comprise a latch circuit coupled to the first control node and the second control node to supply the enable signal to the control assist unit.

Each of the first power switching element and the second power switching element may be a transistor element; and the first control node may be connected to a gate terminal of the first power switching element, and the second control node may be connected to a gate terminal of the second power switching element.

BRIEF DESCRIPTION OF DRAWINGS

Example embodiments of the present invention will become more apparent by describing example embodiments of the present invention in detail with reference to the accompanying drawings, in which.

DETAILED DESCRIPTION OF EXAMPLE EMBODIMENTS

Figure 1A:
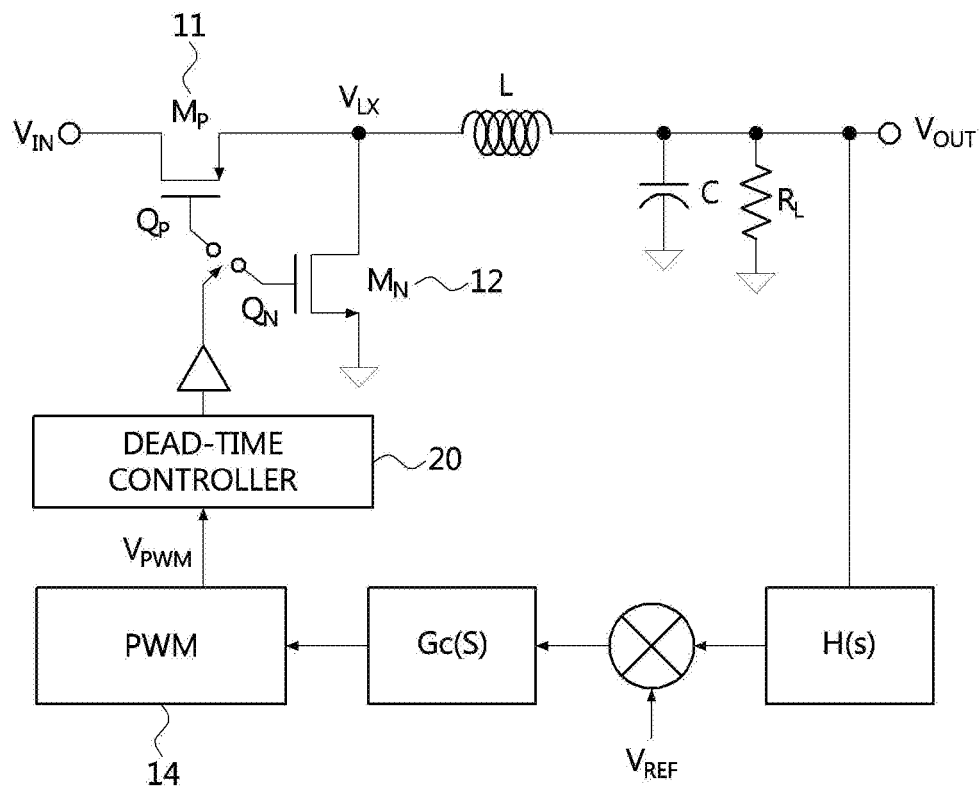
FIG. 1A is a circuit diagram of a synchronous buck converter.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Hereinafter, example embodiments of the present invention will be described in detail with reference to the accompanying drawings.

Figure 1B:
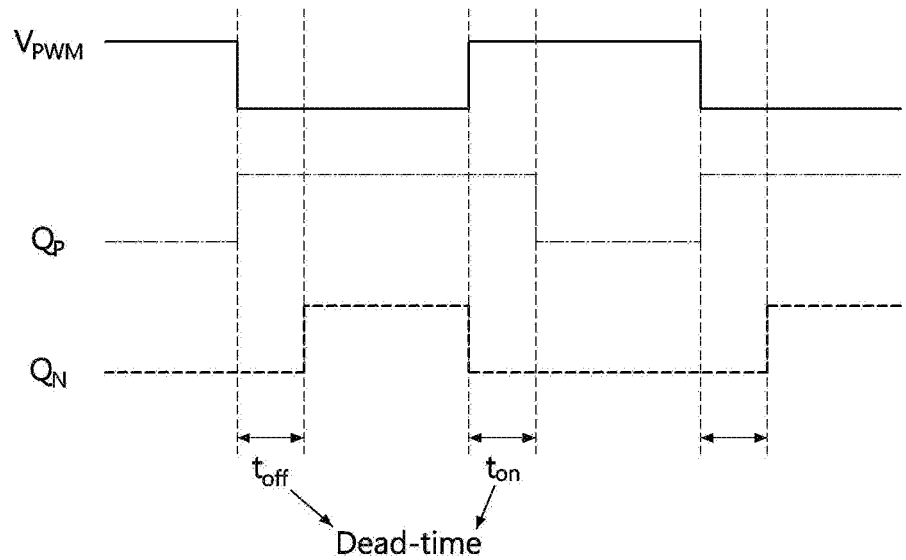
FIG. 1B is a signal timing diagram of a synchronous converter.

FIG. 1A is a circuit diagram of a synchronous buck converter, and FIG. 1B is a signal timing diagram of a synchronous converter.

In FIG. 1A, an $M_P$ 11 and an $M_N$ 12 respectively indicate a P-channel metal oxide semiconductor (PMOS) power switch and an N-channel metal oxide semiconductor (NMOS) power switch, and a $V_{LX}$ node indicates an output node connected to an inductor. An output voltage is input to a pulse width modulation (PWM) 14 via blocks H(s) and Gc(s) for gain control and a stable processing in a frequency domain.

A buck converter is a circuit for lowering an input voltage $V_{IN}$ to be used as an output voltage $V_{OUT}$, and the buck converter is also referred to as a step-down converter. In a synchronous converter such as the example shown in FIG. 1A, controlling switches to be turned on or off is very important in order to maintain reliability and high efficiency.

Particularly, in order to prevent breakdown due to a large short-circuit current in FIG. 1A, the $M_P$ 11 and the $M_N$ 12 which are power switches should not be simultaneously turned on. In order to prevent both the switches $M_P$ 11 and $M_N$ 12 from being simultaneously turned on, a turn-on dead-time $t_{on}$ and a turn-off dead-time $t_{off}$ should be ensured, as shown in FIG. 1B.

Many applications employ a fixed dead-time control method because a dead-time can be ensured in a simplified manner. The fixed dead-time control method has an advantage of securing ON/OFF dead-times by sufficiently increasing the turn-on dead-time $t_{on}$ and the turn-off dead-time to$_{ff}$ even in any load condition.

However, when a dead-time occurs, an inductor current is discharged through a parasitic capacitor existing at the $V_{LX}$ node, thus a body diode of the $M_N$ transistor 12 is turned on, and this phenomenon clearly appears as the dead-time becomes longer. The body diode being turned on causes the following problems in a synchronous converter.

First, the body diode being turned on causes an additional conduction loss and a reverse recovery loss. These energy losses become more severe at a high switching frequency. Further, the operation of the body diode distorts the output voltage so as to generate large current harmonics and large voltage ripples in the synchronous converter.

To this end, a power converter according to one embodiment of the present invention may include a first power switching element 11 connected to an input voltage, a second power switching element 12 connected to the first power switching element 11 through a switching node, an output circuit (including L, C, and RL) coupled to the switching node, and a dead-time controller 20.

The dead-time controller 20 according to the present invention may include a control switching element for generating a fixed dead-time between the first power switching element 11 and the second power switching element 12, and a control sub-unit for reducing the dead-time between the first power switching element 11 and the second power switching element 12, which is generated by the control switching element. A detailed operation of the dead-time controller 20 will be described with reference to FIGS. 2 to 8.

Here, the PWM 14 serves as a driving signal generator for generating a driving signal $V_{PWM}$ of a pulse form and supply the driving signal $V_{PWM}$ to the control switching element.

Figure 2A:
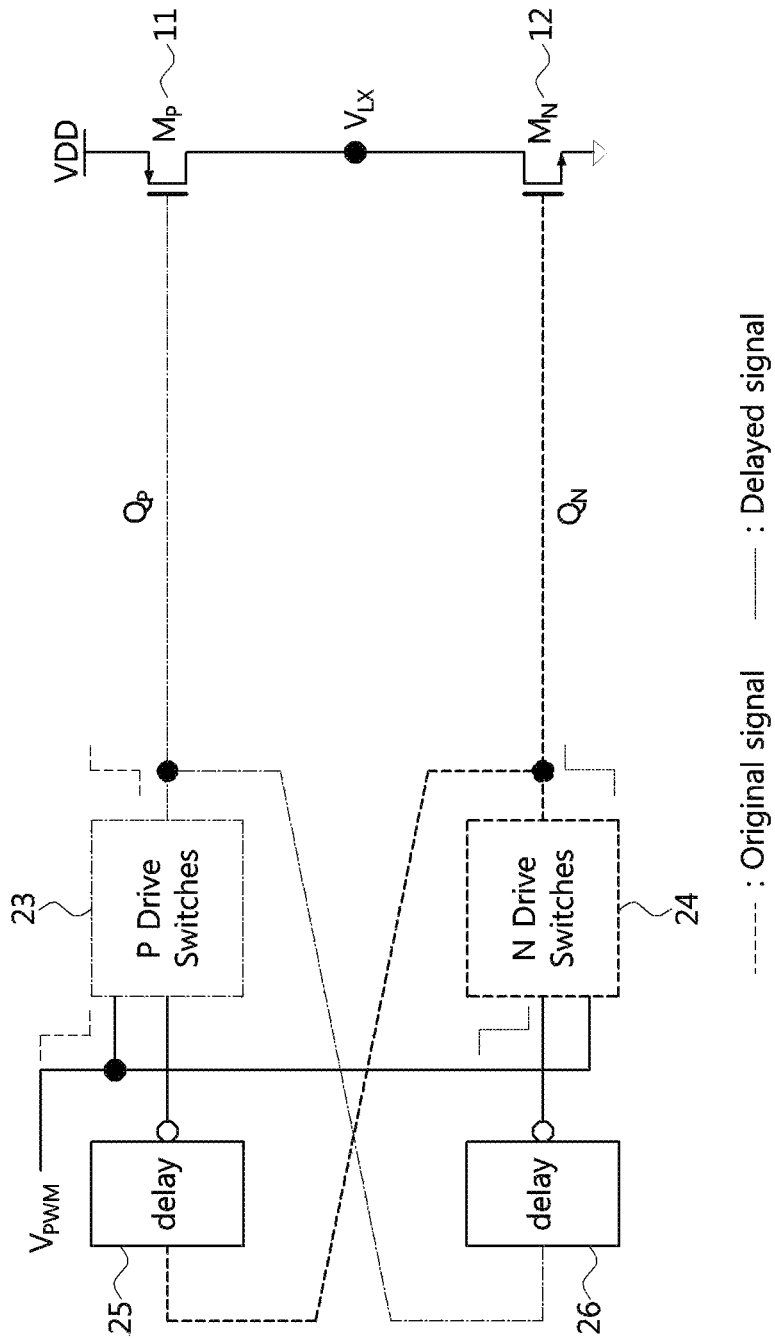
FIG. 2A is a block diagram of a fixed dead-time controller to which the present invention is applicable.
Figure 2B:
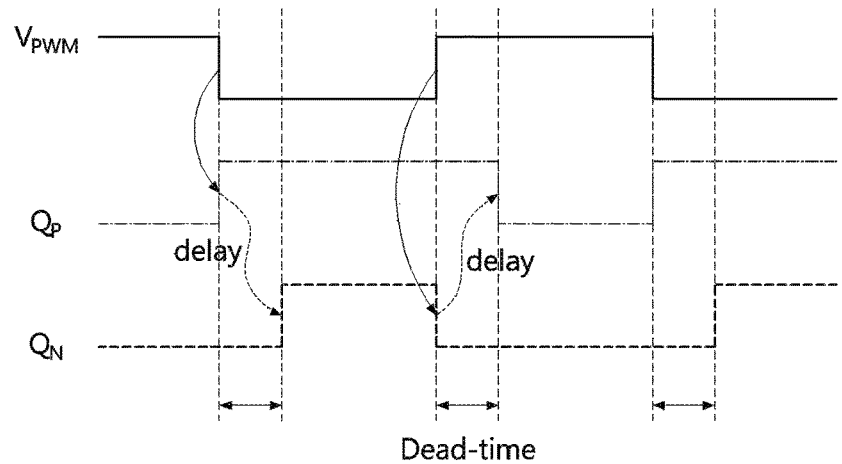
FIG. 2B is a signal timing diagram of the fixed dead-time controller to which the present invention is applicable.

FIG. 2A is a block diagram of a fixed dead-time controller to which the present invention is applicable, and FIG. 2B is a signal timing diagram of the fixed dead-time controller to which the present invention is applicable.

FIG. 2A illustrates the fixed dead-time controller through a synchronous buck converter, but the fixed dead-time controller may be used in all synchronous converters such as a buck synchronous converter, a boost synchronous converter, a buck-boost synchronous converter, and the like.

In FIG. 2A, an $M_P$ 11 and an $M_N$ 12 respectively refer to a PMOS power switch and an NMOS power switch, and P/N drive switches 23 and 24 refer to drivers for driving the $M_P$ and $M_N$ power switches 11 and 12. Further, delays 25 and 26 refer to delay blocks for generating a fixed dead-time, and a $V_{LX}$ node indicates an output node connected to an inductor.

Referring to FIG. 2A, when an output $V_{PWM}$ of a modulator, which has a falling edge, is applied to the P drive switches 23 and the N drive switches 24, a rising signal $Q_P$ is output by the P drive switches 23, and thus the $M_P$ power switch 11 is turned off and a $Q_N$ signal passing through the delay 26 and the N drive switches 24 from the $Q_P$ signal turns the $M_N$ power switch 12 on after a fixed dead-time. Here, the driving signal output by the modulator may employ not only a PWM signal but also a signal modulated in a different method. When the $M_N$ power switch 12 is operated and then is turned off, the $Q_P$ signal passing through the delay 25 and the P drive switches 23 turns the $M_P$ power switch 11 on after a fixed dead-time.

The fixed dead-time controller described with reference to FIG. 2A may operate as a control switching element according to one embodiment of the present invention, and the control switching element may include a first control switching element 23 connected to a first control node connected to a control terminal of the first power switching element 11, and a second control switching element 24 connected to a second control node connected to a control terminal of the second power switching element 12.

The control switching element may further include a first delay 25 for delaying the $Q_N$ signal of the second control node and supplying the delayed $Q_N$ signal to the first control switching element 23, and a second delay 26 for delaying the $Q_P$ signal of the first control node and supplying the delayed $Q_P$ signal to the second control switching element 24.

As shown in the timing diagram of FIG. 2B, the fixed dead-time controller operating as described above has a predetermined dead-time, and as the predetermined dead-time increases, influence of the body diode of the $M_N$ switch 12 increases.

Figure 3:
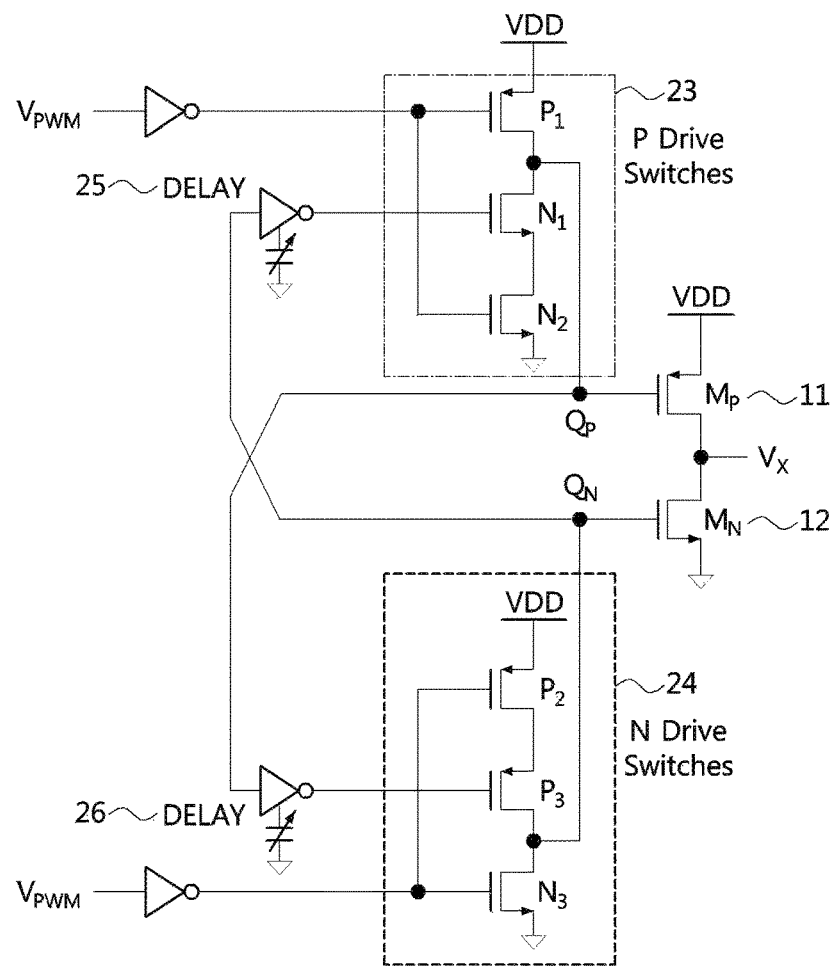
FIG. 3 is a circuit diagram of a fixed dead-time controller.

FIG. 3 is a circuit diagram of the fixed dead-time controller.

In FIG. 3, P-drive switches 23 configured to drive a PMOS power switch 11 may include a PMOS device and an NMOS device. Further, N-drive switches 24 configured to drive an NMOS power switch 12 may include a PMOS device and an NMOS device.

According to the embodiment shown in FIG. 3, the P-drive switch 23 may include one PMOS device and two NMOS devices so as to implement a P-drive switching function. On the contrary, the N-drive switch 24 may include two PMOS devices and one NMOS device so as to implement an N-drive switching function, and a connection relationship between the internal devices is different from that of the P-drive switch 23.

Figure 4A:
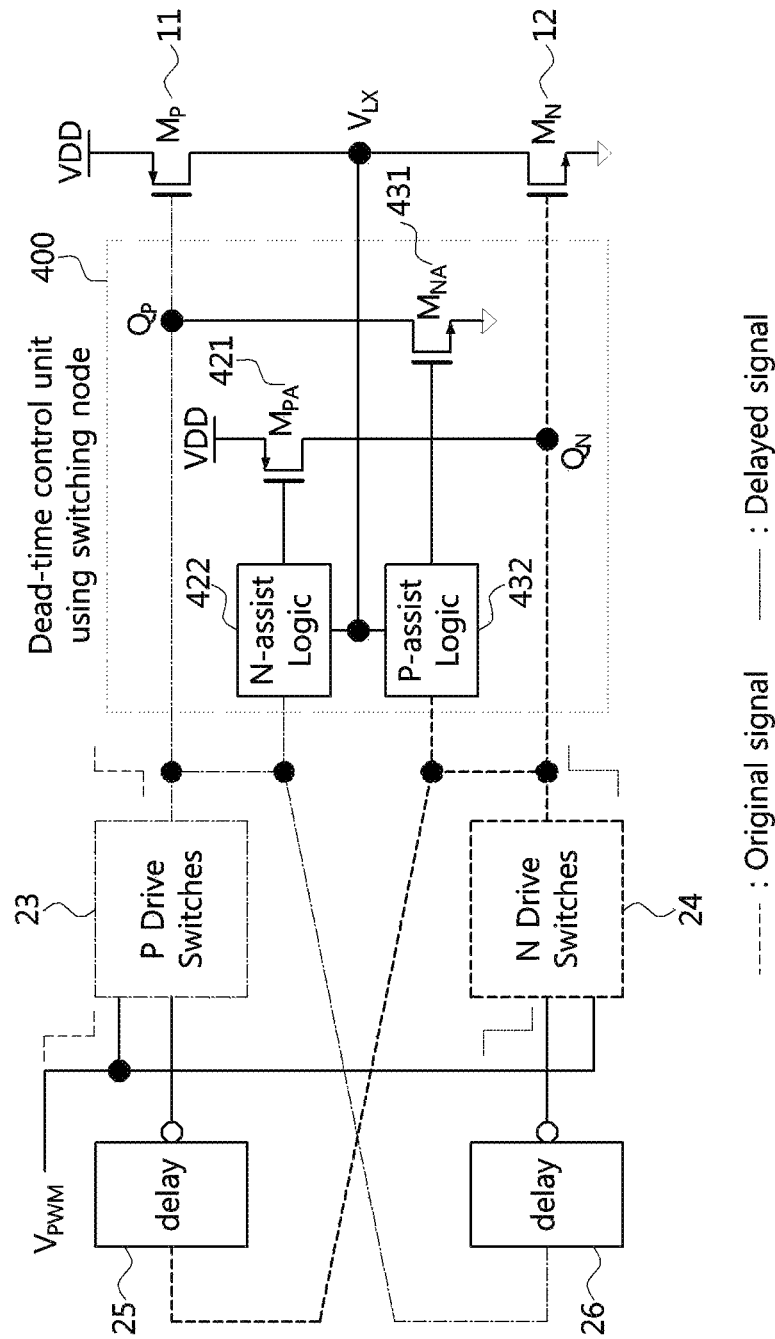
FIG. 4A is a block diagram of a dead-time controller according to one embodiment of the present invention.
Figure 4B:
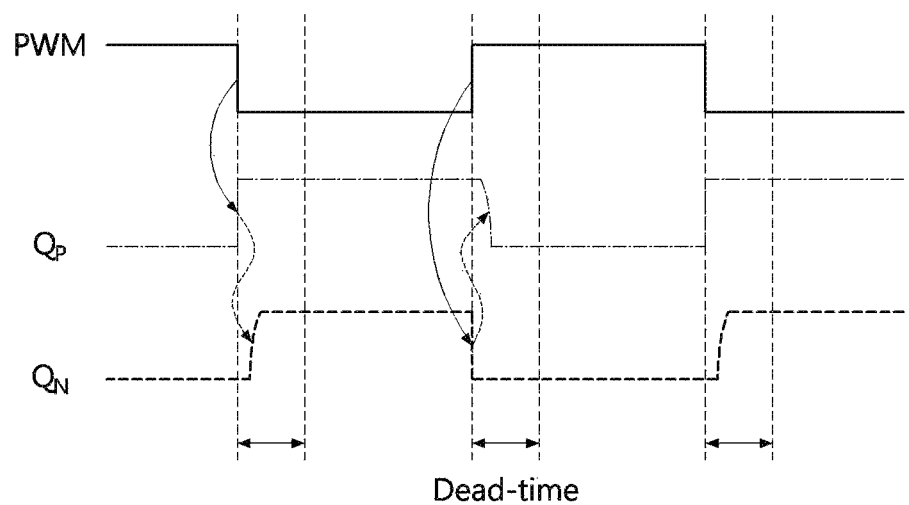
FIG. 4B is a signal timing diagram of the dead-time controller according to one embodiment of the present invention.

FIG. 4A is a block diagram of a dead-time controller according to one embodiment of the present invention, and FIG. 4B is a signal timing diagram of the dead-time controller according to one embodiment of the present invention;

The dead-time controller according to one embodiment of the present invention shown in FIG. 4A has been proposed to resolve the problem of the fixed dead-time control circuit shown in FIGS. 2A and 2B, and the dead-time controller is shown in the form of a block diagram.

For example, the dead-time controller according to the present invention may be configured such that a switching node assisted dead-time control (SADTC) module using a switching-node, which assists an operation of turning on a power switch by receiving a switching node signal, is connected parallel to the conventional fixed dead-time control circuit as illustrated in FIG. 3. A SADTC module 400 according to the present invention is configured to be connected parallel to overall drivers of the conventional fixed dead-time controller, and thus the SADTC module 400 may be applied to any type of a fixed dead-time controller.

That is, the dead-time control circuit according to one embodiment of the present invention is a circuit for controlling a dead-time of a power converter including a first power switching element 11 connected to an input voltage, a second power switching element 12 connected to the first power switching element 11 through a switching node, and an output circuit connected to the switching node, and the dead-time control circuit may include control switching elements 23, 24, 25, and 26 for controlling the first power switching element 11 and the second power switching element 12 through a first control node coupled to the first power switching element 11 and a second control node coupled to the second power switching element 12, and an assist control unit 400 configured to reduce a dead time between the first power switching element 11 and the second power switching element 12, wherein the dead-time is generated by the control switching device on the basis of voltages of the switching node and the first control node, or voltages of the switching node and the second control node.

The assist control unit 400 may be disposed parallel to the control switching element by being connected to the first control node, the second control node, and the switching node.

The assist control unit 400 may include a first assist transistor 421 for assisting an operation of turning on the second power switching element 12, a first assist module 422 coupled to the switching node and configured to drive the first assist transistor 421, a second assist transistor 431 for assisting an operation of turning on the first power switching element 11, and a second assist module 432 connected to the switching node and configured to drive the second assist transistor 431.

Here, the first assist module 422 is enabled in synchronized with the voltage of the switching node, which is changed to a low state, and the enabled first assist module 422 turns the first assist transistor 422 on to turn the second power switching element 12 on, and the second assist module 432 is enabled according to the voltage of the switching node in the low state and an enable signal, and the enabled second assist module 432 turns the second assist transistor 431 on to turn the first power switching device 11 on.

More specifically, the SADTC unit 400, which is a control assistance unit according to one embodiment of the present invention, may include an $M_{P4}$ transistor 421 for assisting an operation of turning on the NMOS switch $M_N$ 12, which is the second power switch, an N-assist logic 422 for driving the $M_{P4}$ transistor 421 with the aid of a switching node $V_{LX}$, an $M_{N4}$ transistor 431 for assisting an operation of turning on a PMOS switch $M_P$ 11, and a P-assist logic 432 for driving the $M_{N4}$ transistor 431 with the aid of the switching node $V_{LX}$.

To describe the SADTC unit 400 with reference to FIG. 4A, when the power switch $M_P$ 11 is turned off by a $V_{PWM}$ signal, an inductor current is discharged through a parasitic capacitor existing at the switching node $V_{LX}$, so that a body diode of an $M_N$ transistor 12 is turned on and thus a voltage of the switching node $V_{LX}$ drops below zero. When the voltage of at the switching node $V_{LX}$ drops below zero, the N-assist module 422 assumes that an operation of turning off the power switch $M_P$ 11 is completed and outputs a low signal to turn on the $M_{P4}$ transistor 421. Then, the MN transistor 12, which is driven only by the outputs of the fixed dead-time controllers 23 to 26 in the embodiment of FIG. 3, is turned on by operation of the $M_{P4}$ transistor 421 in the embodiment of FIG. 4A immediately when the power switch $M_P$ 11 is turned off.

The PMOS switch $M_P$ 11 being turned on after the $M_N$ transistor 12 is turned off operates with a slightly different principle. When the $M_N$ transistor 12 is turned off, a $V_{LX}$ value is not changed as when the $M_P$ 11 is turned off. Therefore, in this case, the P-assist module 432 is enabled when the $V_{LX}$ value is low and outputs a high value only when a $Q_N$ signal is low to turn on the $M_{N4}$ 431. When the $M_{NA}$ 431 is turned on, before a turn-on signal is applied to the switch $M_P$ 11 by the fixed dead-time controllers 23 to 26, a $Q_P$ signal becomes to be low to turn on the switch $M_P$ 11, thereby reducing the dead-time. Referring to the timing diagram of FIG. 4B, it can be seen that a dead-time period according to the dead-time controller using the switch node according to the present invention is reduced as compared with the existing dead-time period.

Figure 5A:
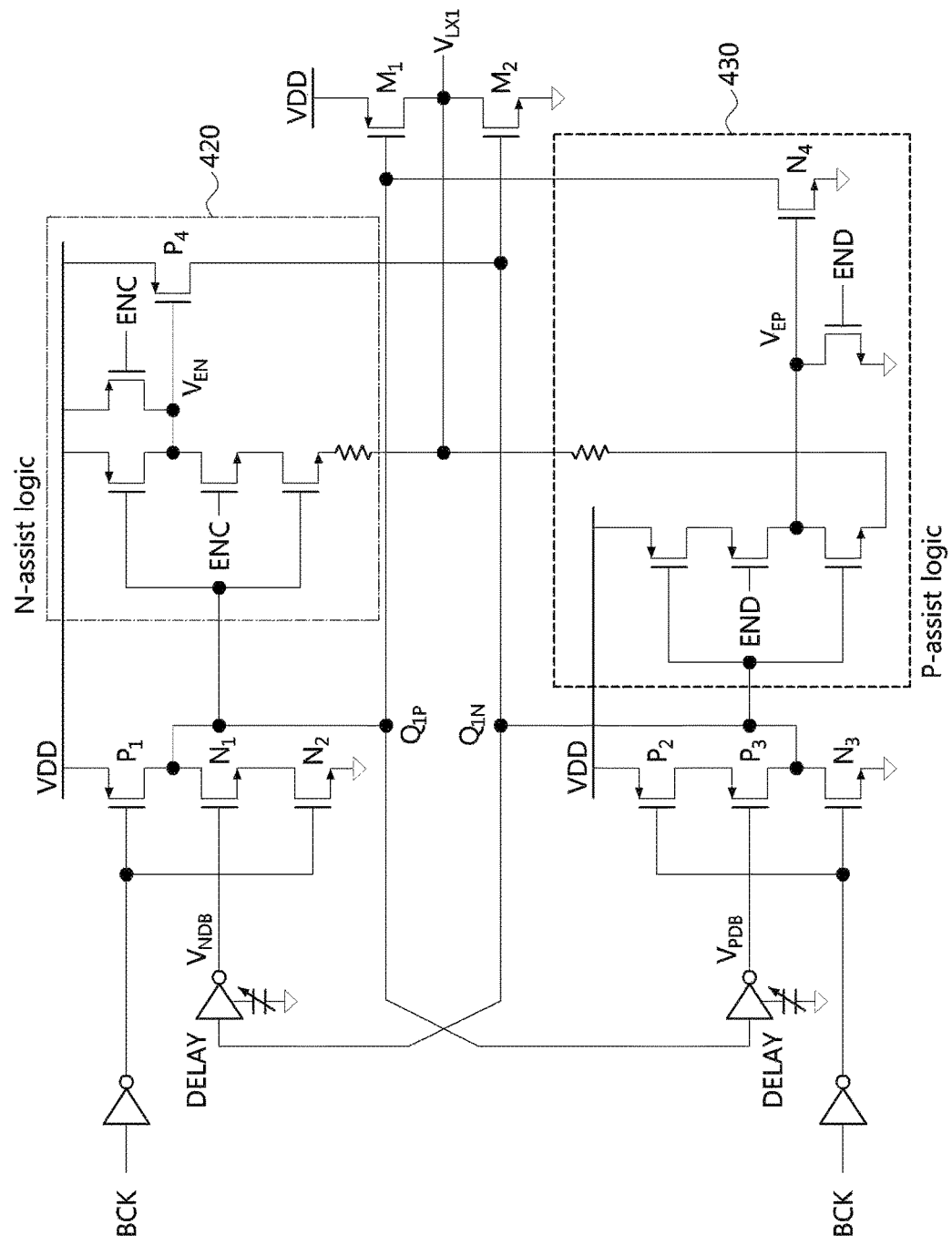
FIG. 5A is a diagram illustrating an embodiment in which a dead-time control circuit according to the present invention is applied to a synchronous buck converter.
Figure 5B:
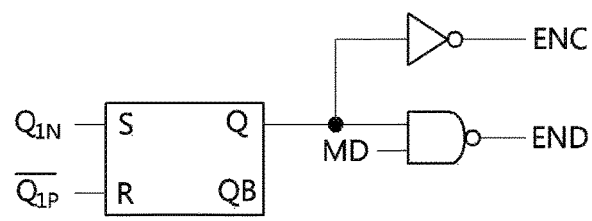
FIG. 5B is a diagram illustrating an embodiment of a Ser/Reset (SR) latch circuit applied to the dead-time controller according to the present invention.

FIG. 5A illustrates an example in which a dead-time control circuit according to the present invention is applied to a synchronous buck converter. FIG. 5B illustrates an example of an SR latch circuit applied to the dead-time controller according to the present invention.

A configuration of FIG. 5A is merely an example of the present invention, and the dead-time controller according to the present invention may be used in various switching power converters such as a synchronous boost converter, a buck-boost converter in which a buck converter and a boost converter are combined, and the like.

Operation of the dead-time control circuit of FIG. 5A is basically the same as the operation of the dead-time controller shown in FIG. 4.

Particularly, referring to 5A, the dead-time control assistant circuits 420 and 430 according to one embodiment of the present invention detect body diode conduction using a switching node voltage $V_{LX1}$ and gate driving signals $Q_{1P}$ and $Q_{1N}$ of power switches $M_1$ and $M_2$, thereby control an excessive dead-time. The dead-time control circuit may include an N-assist unit 420 and a P-assist unit 430, the N-assist unit 420 controls operation of the second power switch $M_2$, and the P-assist unit 430 controls operation of the first power switch $M_1$.

When a bit clock input (BCK) signal, which is a driving signal for the dead-time controller, is changed from a low level to a high level, the $Q_{1P}$ signal is changed from a low level to a high level according to the BCK signal. Accordingly, the first power switch $M_1$ is turned off and the second power switch $M_2$ is already turned off in a previous state. A state in which both the first power switch $M_1$ and the second power switch $M_2$ are turned off is a dead time state. During the dead-time period, an inductor current discharges a parasitic capacitor of the switching node voltage $V_{LX1}$, and thus a body diode of the second power switch $M_2$ is turned on and the switching node voltage $V_{LX1}$ is changed to a state below zero. The presence of conduction of the body diode means an excessive dead time, so this state is preferably terminated as soon as possible.

Here, when $V_{LX1}<0$ and an enable signal ENC is maintained at a high level by operation of an SR latch shown in FIG. 5B, the N-assist circuit 420 is enabled alone. Thus, a voltage $V_{EN}$ is set to a low level. The voltage $V_{EN}$ in the low state enables activates a P-type transistor P4 to turn on the $M_2$ regardless of the fixed dead-time, thereby terminating the dead-time. With such a configuration of the present invention, a conduction period of the body diode can be minimized.

Contrarily, even when the BCK signal is changed from a high level to a low level, the $Q_{1N}$ signal is changed from a high level to a low level according to the BCK signal. Accordingly, the second power switch $M_2$ is turned off and the first power switch $M_1$ is already turned off in a previous state. Therefore, even in this case, a dead-time condition is made. During this time, since $V_{LX1}<0$ and an enable signal END is maintained at a low level, the P-assist unit 430 is enabled and thus a voltage $V_{EP}$ is set to a high level. The voltage $V_{EP}$ activates an N-type transistor N4 for turning on the first power switch $M_1$. Due to a large charge current from a power supply, a rising time of the switching node voltage $V_{LX1}$ is very short and thus a fixed short dead-time is required in a P-assist mode in which the P-assist unit 430 is operated. For this reason, a turn-on transition time of the first power switch $M_1$ may be controlled by appropriately selecting sizes of an inverter and the N-type transistor $N_4$ of the P-assist unit 430.

Further, FIG. 5B illustrates an SR latch circuit configured to generate an enable signal and supply the enable signal to the N-assist unit 420 and the P-assist unit 430. Referring to FIG. 5B, the enable signal is generated and output through the SR latch circuit, and a NOT gate and a NAND gate which are connected to outputs of the SR latch circuit. Unlike the N-assist unit 420, when the P-assist unit 430 is operated, since there is no enable signal such as a variation of the switching node voltage $V_{LX1}$, the enable signal END is generated and provided through the SR latch circuit so as to allow the P-assist unit 430 to be operated. Consequently, the P-assist unit 430 is enabled only after the switch $M_2$ is turned off, such that the dead-time may be controlled.

Meanwhile, the P-assist unit 430 is not needed to be operated in a discontinuous conduction mode (DCM) and is operated only in a continuous conduction mode (CCM). Therefore, in the embodiment of FIG. 5A, according to a mode signal MD of the SR latch circuit shown in FIG. 5B, the END signal which is a P-assist unit enable signal is enabled only in the CCM and is disabled in the DCM.

Figure 6:
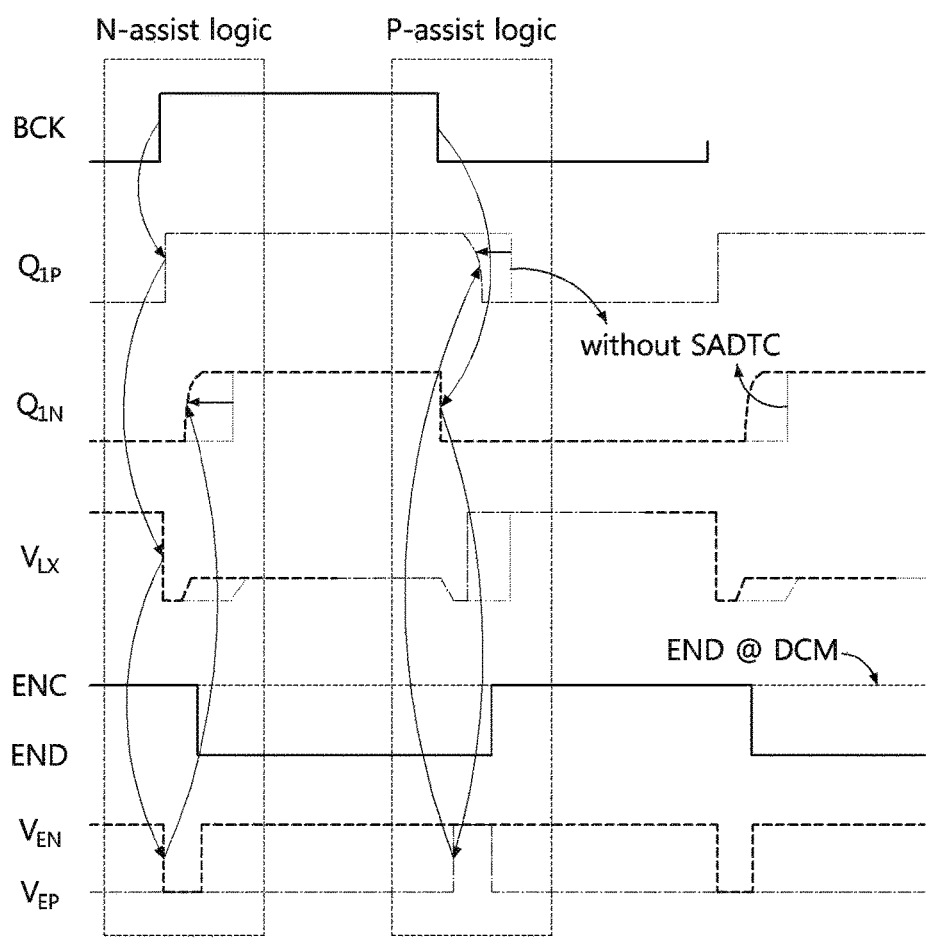
FIG. 6 is a signal timing diagram in a converter to which a dead-time control circuit according to one embodiment of the present invention is applied.

FIG. 6 is a signal timing diagram in a converter to which a dead-time control circuit according to one embodiment of the present invention is applied. Particularly, FIG. 6 illustrates a timing diagram of a SADTC circuit for a buck converter.

Referring to the timing diagram of FIG. 6, it can be seen that the dead-times of the $Q_{1P}$ and $Q_{1N}$ signals are reduced as compared with the dead-times shown in the timing diagram of FIG. 2B (indicated as dotted lines in the $Q_{1P}$ and $Q_{1N}$ signals of FIG. 6), which is a timing diagram when only the fixed dead-time control circuit is applied without using the SADTC module/circuit). Further, it can be seen that the enable signal END of the P-assist unit 430 configured to control a dead-time of the buck converter is disabled in the DCM mode.

Figure 7A:
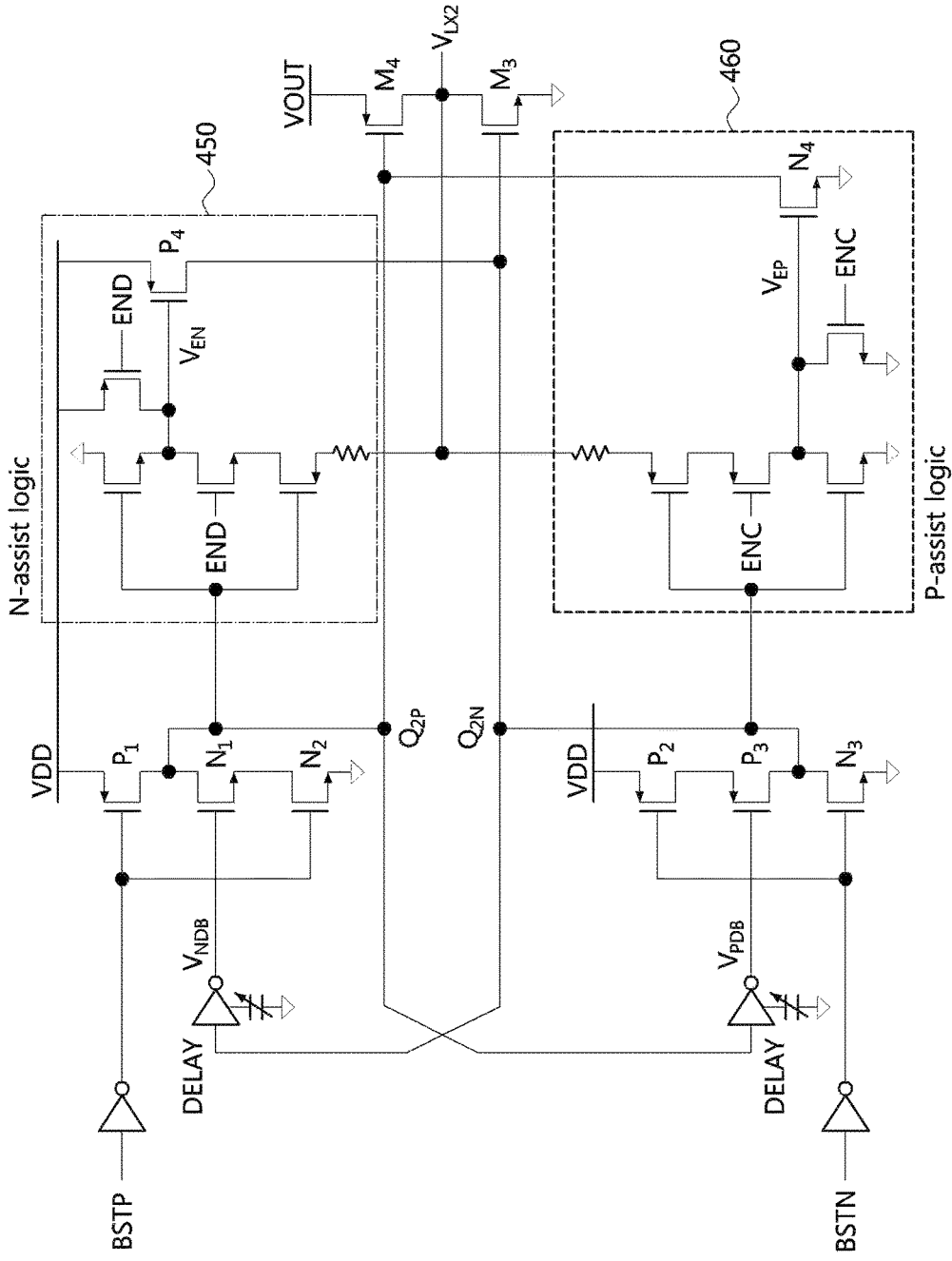
FIG. 7A is a diagram illustrating another embodiment of a converter to which the dead-time control circuit according to the present invention is applied.
Figure 7B:
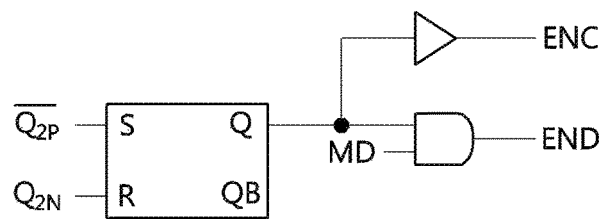
FIG. 7B is a diagram illustrating another embodiment of an SR latch circuit applied to the dead-time controller according to the present invention.

FIG. 7A illustrates another embodiment of a converter to which the dead-time control circuit according to the present invention is applied. FIG. 7B illustrates another embodiment of the SR latch circuit applied to the dead-time controller according to the present invention.

FIG. 7A illustrates an example in which the dead-time control circuit according to the present invention is applied to a synchronous buck converter. Even in the case of a boost converter, operation of the dead-time controller is performed similar to operation of the buck converter.

However, since the embodiment of FIG. 7A is applied to the boost converter, unlike the case in which the dead-time control circuit is applied to the buck converter shown in FIG. 5A, the END signal operates as an enable signal for an N-assist unit 450. Further, in the case of operation of the boost converter in the DCM, since it is not necessary to turn on a transistor $M_3$ immediately after turning off a transistor $M_4$, a mode signal MD related to the DCM or the CCM mode is applied to the END signal.

Figure 8:
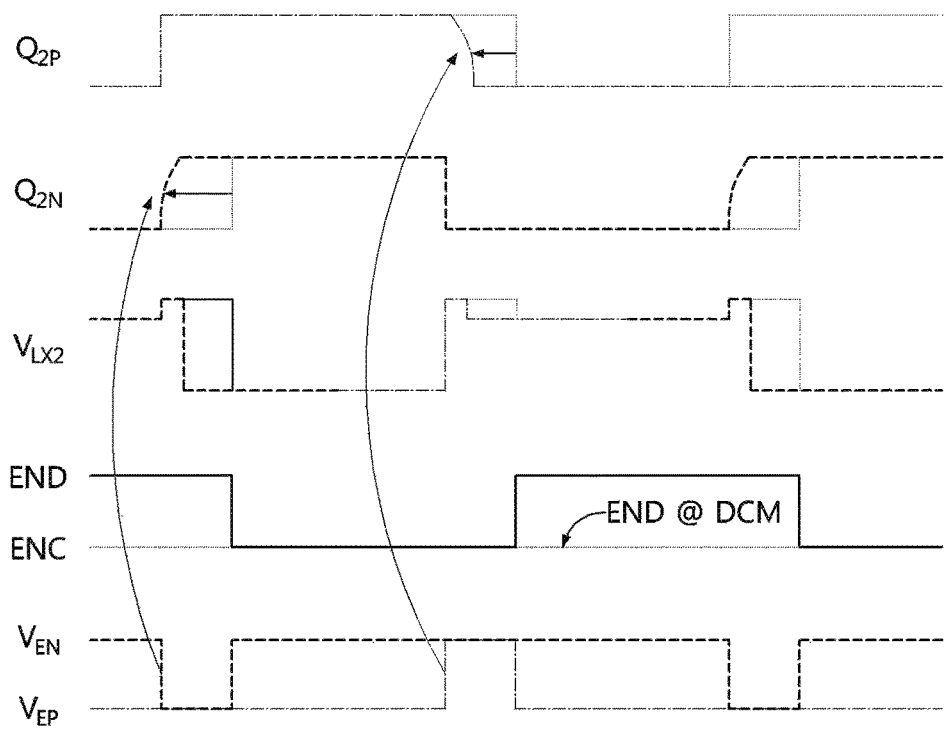
FIG. 8 is a signal timing diagram of a converter to which a dead-time control circuit according to another embodiment of the present invention is applied.

FIG. 8 is a signal timing diagram of a converter to which a dead-time control circuit according to another embodiment of the present invention is applied. Particularly, FIG. 8 illustrates a timing diagram of the SADTC circuit for the boost converter.

Referring to the timing diagram of FIG. 8, it can be seen that dead-times of the $Q_{2P}$ and $Q_{2N}$ signals are reduced as compared with the dead-times shown in the timing diagram of FIG. 2B (indicated as dotted lines in the $Q_{2P}$ and $Q_{2N}$ signals of FIG. 8), which is a timing diagram when only the fixed dead-time control circuit is applied without using the SADTC module/circuit). Further, it can be seen that the enable signal END of the N-assist unit 450 configured to control a dead-time of the boost converter is disabled in the DCM mode.

Figure 9A:
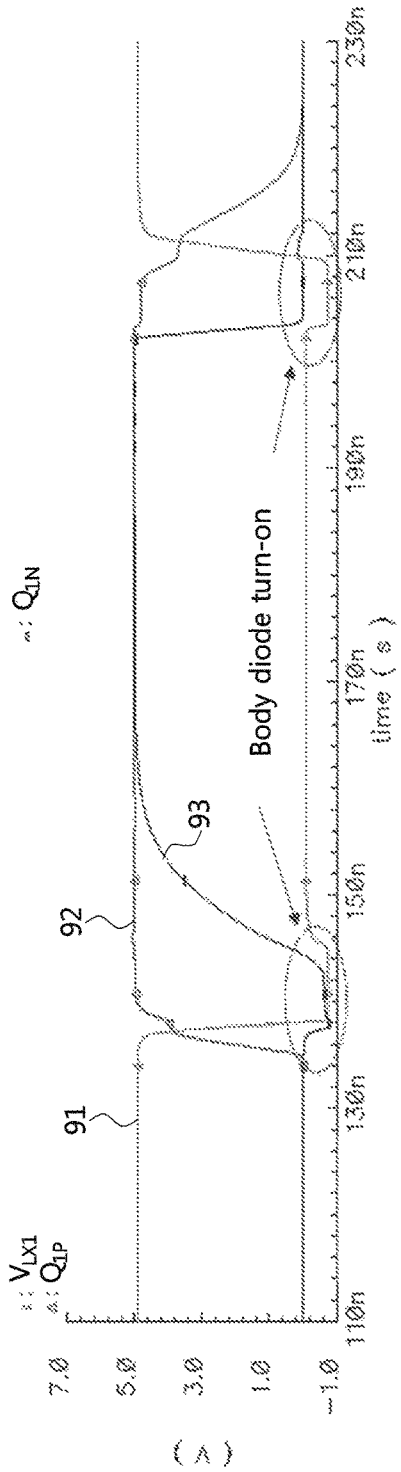
FIG. 9A is a diagram showing a simulation result of a transient waveform of a power converter to which a fixed dead-time control is applied.

FIG. 9A shows a simulation result of a transient waveform of a power converter to which a fixed dead-time control is applied.

Figure 9B:
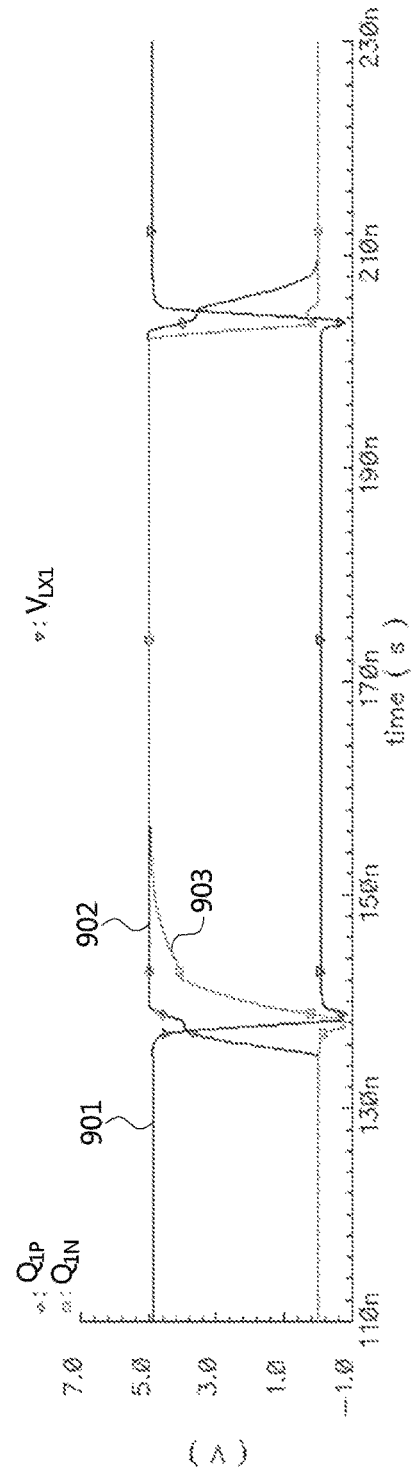
FIG. 9B is a diagram showing a simulation result of a switching-node assisted dead-time control (SADTC) transient waveform according to one embodiment of the present invention.

FIG. 9B shows a simulation result of a SADTC transient waveform according to one embodiment of the present invention. FIG. 9B shows features when the simulation result of a transient waveform of the SADTC according to the present invention is applied to the buck converter. Meanwhile, although not shown in the drawing, the transient waveform of the SADTC according to the present invention applied to the boost converter also shows a result similar to the simulation result of FIG. 9B.

FIG. 9A shows a characteristic of the buck converter in a case in which the SADTC module/circuit according to the present invention is not applied, and FIG. 9B shows a characteristic of the buck converter in a case in which the SADTC module/circuit according to the present invention is applied. Referring to FIG. 9A, in the case of the buck converter in which the SADTC circuit is not used, it can be seen that an NMOS $Q_{1N}$ 93 is turned on after a PMOS $Q_{1P}$ 92 is turned on and then a predetermined delay time passes. Therefore, it is possible to prevent a shoot through current between the power switch driving signals, thereby securing a stable operation. At this point, however, looking at a waveform 91 of the switching node voltage $V_{LX1}$, it can be seen that the switching node voltage $V_{LX1}$ becomes −0.7 V during the delay time, and thus the body diode of the NMOS power switch is turned on.

When the body diode is turned on, a reverse current flows through the buck converter, so that the reverse current acts as a factor for reducing efficiency. In this situation, when the SADTC circuit according to the present invention is applied, it can be seen that a time for which the switching node voltage $V_{LX1}$ 901 drops to −0.7 V can be minimized as shown in FIG. 9B. That is, the proposed SADTC circuit is operated to prevent an overlap of on-times of the PMOS power switch and the NMOS power switch in a section where the power switch is switched and to minimize a turn-on time of the body diode of the NMOS power switch by sensing the voltage $V_{LX1}$, such that it can be expected to improve efficiency of the buck converter.

Figure 10:
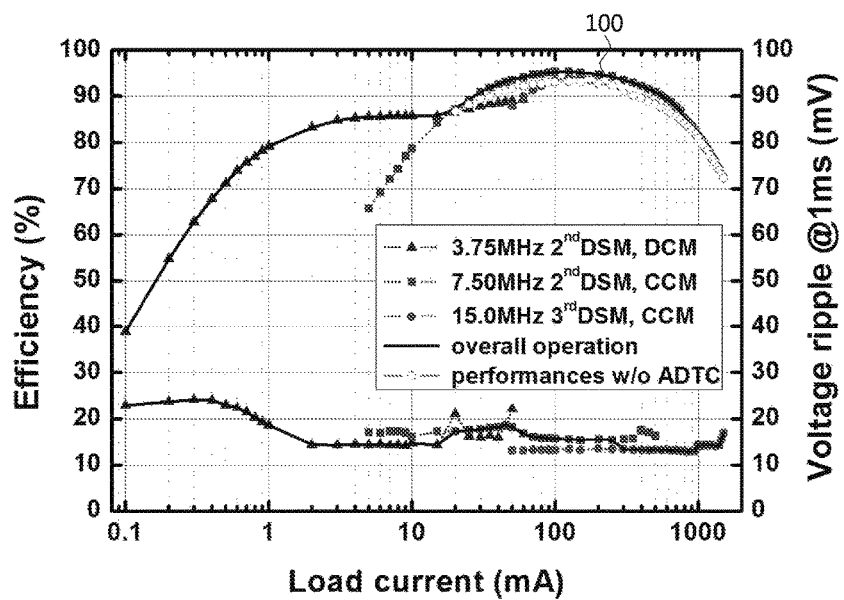
FIG. 10 is a graph illustrating converter efficiency according to a load current of a buck converter to which the dead-time control circuit according to the present invention is applied.

FIG. 10 is a graph illustrating converter efficiency according to a load current of a buck converter to which the dead-time control circuit according to the present invention is applied.

The graph of FIG. 10 shows efficiency according to a load current of the buck converter to which the present invention is applicable. FIG. 10 shows the efficiency for each of switching frequencies of 3.75 MHz, 7.5 MHz, and 15 MHz when the buck converter is operated in second or third DCM or CCM, and overall operation efficiencies are shown in a solid line 100. Referring to FIG. 10, it can be seen that the efficiency in the case of using an assisted dead-time control (ADTC) in a load range of 20 mA to 1000 mA is higher.

As described above, in accordance with the present invention, the efficiency of the synchronous converter can be improved because a conduction loss and a reverse recovery loss can be reduced by efficiently controlling a dead-time.

The converter according to the present invention as described through the above-described embodiments uses the switching node voltage similar to an adaptive dead-time control method so as to control the dead-time, but the converter can be implemented in a very simplified manner without requiring a comparator and complicated logics.

Further, since the switching node voltage in the converter is simply used as the enable signal of the assist circuit, the performance of the converter is not affected by sensitivity of the switching node voltage.

Furthermore, in accordance with the present invention, since the dead-time is controlled by using only a process of turning on the power switches, it is more efficient than a method of controlling both turn on and off times.

Moreover, the dead-time can be efficiently controlled according to an amount of an output current (DCM and CCM operations) through a simplified RS flip-flop.

Additionally, in accordance with the embodiments of the present invention, dead-time control is configured by adding a switching node based dead-time control circuit (or block) to the fixed dead-time control circuit, such that it has an advantage capable of being applied to any conventional fixed dead-time control circuit.

The power converter according to the present invention can be utilized in a variety of portable electronic products requiring batteries, such as a notebook computer, a personal digital assistant (PDA), a portable multimedia player (PMP), a playstation portable (PSP), a wireless communication terminal, a smart phone, and the like.

The above-described converter according to the present invention uses a switching node voltage similar to that used in an adaptive dead-time control method so as to control a dead-time, but the converter can obtain high power efficiency in a very simplified manner without requiring a comparator and complicated logics.

Further, since the switching node voltage in the converter is simply used as an enable signal of an assist circuit, the performance of the converter is not affected by sensitivity of the switching node voltage.

Furthermore, in accordance with the present invention, since the dead-time is controlled by using only a process of turning on power switches, it is more efficient than a method of controlling both turn on and off times.

Moreover, the dead-time can be efficiently controlled according to an amount of an output current through a simplified RS flip-flop.

Additionally, the embodiments of the present invention can be implemented by adding a switching node based dead-time control circuit (or block) to the fixed dead-time control circuit, such that these embodiments have an advantage capable of being applied to any conventional fixed dead-time control circuit.

While the example embodiments of the present invention and their advantages have been described in detail, it should be understood that various changes, substitutions and alterations may be made herein without departing from the scope of the invention.

What is claimed is:
1. A power converter comprising:
a first power switching element through which an input voltage is applied;
a second power switching element connected to the first power switching element through a switching node;
an output circuit coupled to the switching node;

a control switching element configured to control the first power switching element and the second power switching element through a first control node connected to the first power switching element and a second control node connected to the second power switching element; and a control assist unit configured to control the control switching element on the basis of a voltage of the switching node and a voltage of the first control node or to control the control switching element on the basis of a voltage of the switching node and a voltage of the second control node, wherein the control assist unit includes a first assist module and a first assist transistor, wherein the first assist module is enabled in synchronized with a voltage of the switching node, which is changed to a low state, and the enabled first assist module turns the first assist transistor on, thereby turning the second power switching element on, wherein the control assist unit further includes a second assist module and a second assist transistor, and wherein the second assist module is enabled according to the voltage of the switching node in the low state and outputs a high value when the voltage of the second control node is low to turn the second assist transistor on, thereby turning the first power switching element on.

2. The power converter of claim 1, wherein the control assist unit reduces a dead-time between the first power switching element and the second power switching element, wherein the dead-time is generated by the control switching element.

3. The power converter of claim 1, wherein the control assist unit is connected to the first control node, the second control node, and the switching node and is disposed parallel to the control switching element.

4. The power converter of claim 1, wherein the control assist unit controls the second power switching element on the basis of a voltage of the switching node, which varies according to operation of the first power switching element driven by a driving signal.

5. The power converter of claim 1, wherein the control assist unit controls the first power switching element according to an enable signal determined on the basis of the second power switching element to be turned off, and a voltage of the switching node.

6. The power converter of claim 1, further comprising a latch circuit coupled to the first control node and the second control node to supply an enable signal to the control assist unit.

7. The power converter of claim 1, wherein:

each of the first power switching element and the second power switching element is a transistor element; and the first control node is connected to a gate terminal of the first power switching element, and the second control node is connected to a gate terminal of the second power switching element.

8. The power converter of claim 1, wherein the control switching element includes:

a first control switching element connected to a first control node which is connected to a control terminal of the first power switching element; and a second control switching element connected to a second control node which is connected to a control terminal of the second power switching element.

9. The power converter of claim 8, wherein the control switching element includes:

a first delay configured to delay a signal of the second control node and supply the delayed signal to the first control switching element; and a second delay device configured to delay a signal of the first control node and supply the delayed signal to the second control switching element.

10. The power converter of claim 1, further comprising a driving signal generator configured to generate a driving signal and supply the driving signal to the control switching element.

11. A dead-time controller configured to control a dead-time of a power converter including a first power switching element through which an input voltage is applied, a second power switching element coupled to the first power switching element through a switching node, and an output circuit coupled to the switching node, the dead-time controller comprising:

a control switching element configured to control the first power switching element and the second power switching element through a first control node connected to the first power switching element and a second control node connected to the second power switching element; and a control assist unit configured to reduce a dead-time, which is generated by the control switching element, between the first power switching element and the second power switching element on the basis of a voltage of the switching node and a voltage of the first control node or to control the control switching element on the basis of a voltage of the switching node and a voltage of the second control node, wherein the control assist unit includes a first assist module and a first assist transistor, wherein the first assist module is enabled in synchronized with a voltage of the switching node, which is changed to a low state, and the enabled first assist module turns the first assist transistor on, thereby turning the second power switching element on, wherein the control assist unit further includes a second assist module and a second assist transistor, and wherein the second assist module is enabled according to the voltage of the switching node in the low state and outputs a high value when the voltage of the second control node is low to turn the second assist transistor on, thereby turning the first power switching element on.

12. The dead-time controller of claim 11, wherein the control assist unit is connected to the first control node, the second control node, and the switching node and is disposed parallel to the control switching element.

13. The dead-time controller of claim 11, further comprising a latch circuit coupled to the first control node and the second control node to supply an enable signal to the control assist unit.

14. The dead-time controller of claim 11, wherein:

each of the first power switching element and the second power switching element is a transistor element; and the first control node is connected to a gate terminal of the first power switching element, and the second control node is connected to a gate terminal of the second power switching element.

* * * * *